S. S. PIPER.
LINK GUARD.
APPLICATION FILED MAR. 4, 1911.

1,017,458.

Patented Feb. 13, 1912.

WITNESSES

INVENTOR
SHERIDAN S. PIPER,

Attorneys

UNITED STATES PATENT OFFICE.

SHERIDAN SMITH PIPER, OF SPALDING, IDAHO.

LINK-GUARD.

1,017,458. Specification of Letters Patent. Patented Feb. 13, 1912.

Application filed March 4, 1911. Serial No. 612,183.

*To all whom it may concern:*

Be it known that I, SHERIDAN SMITH PIPER, a citizen of the United States, and a resident of Spalding, in the county of Nez Perce and State of Idaho, have invented certain new and useful Improvements in Link-Guards, of which the following is a specification.

This invention is an improvement in links, such as are commonly used for suspending a charm or other pendant from a watch or other chain, and the invention has for an object to provide a novel construction of link guard which will include as an additional safety, a spring guard crossing the link within the same, held at one end to the link and free at its other end, where it presses yieldingly against the opposite side of the link so the free end of the guard spring may be pushed out of the way to permit the intentional passage of a hanger link in placing the same on and removing it from the main link; and the invention consists in certain novel constructions and combinations of parts as will be hereinafter described and claimed.

Figure 1:
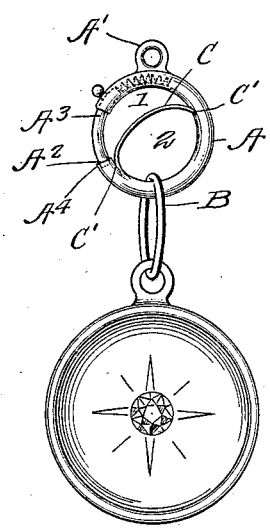
Figure 2:
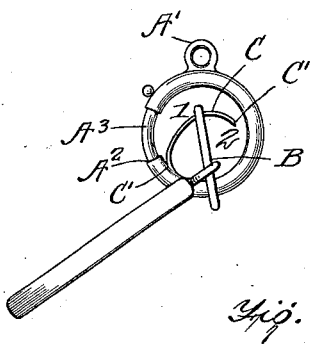
Figure 3:
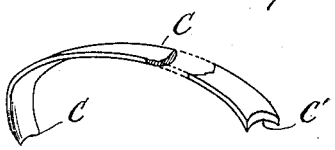

In the drawing Figure 1 is a side view of a link embodying my invention with the guard spring in closed position. Fig. 2 is a similar view with the guard spring in open position. Fig. 3 is a perspective view enlarged, of the guard spring.

The link A may, in general respects, be of the ordinary construction having a suspending eye A' at its top and a side opening A² which may be closed by a circumferentially sliding spring-actuated tongue A³, which moves toward and from the wall A⁴ of the opening A² to permit the insertion of a hanger ring B and the removal thereof when desired. The guard spring C is fixed at one end C' to the link A adjacent to the wall A⁴ of the opening A² and extends within the link A and crosses the same and bears normally at its free end C' against the opposite side of the link. By this construction, the link A is divided by the guard spring into two sections 1 and 2, the latter being guarded by the spring C and the former by the tongue A³. At its free end C', the spring C may be readily bent away from its engagement with the link to permit the ready passage of the hanger ring B in slipping the same onto and off the ring.

It will be noticed that the hanger ring B is made sufficiently large to permit it to pass over the spring C, as will be understood from Fig. 2, in applying it to and removing it from the ring A.

The guard spring C is preferably made of a piece of flat spring metal bent quarter round with the hollow or concave part on the top, thus leaving the point or free end C' of the spring so it will engage the link A in such manner as to brace the guard spring from lateral displacement.

As shown in Figs. 1 and 2, the spring is secured at one end to the inner surface of the link adjacent to the opening therein and extends thence on a curved line across the link and normally contacts at its free end with the opposite side of the link, the convex surface of the spring being on the side thereof toward the opening of the link and the curvature or bow of the spring conforming as to direction generally to that portion of the link facing the convex side of the spring so that the spring may, under stress, be pushed back to coincide with and bear against the inner side of such portion of the link and overlie the opening therein so that there is no danger of the spring being broken or displaced by undue stress thereon and the spring will be at all times in position to guard the opening in the link.

I claim:

An approximately circular link having an opening and a closure therefor, and a spring secured at one end to the inner surface of the link adjacent to the opening therein and extended on a curved line thence across the link and normally contacting at its free end with the opposite side of the link, the convex surface of the spring being on the side thereof toward the opening of the link and the curvature or bow of the spring conforming as to direction, generally, to that portion of the link facing the convex side of the spring whereby the latter may, under stress, be pushed back to coincide with and bear against the inner side of such portion of the link and overlie the opening therein, substantially as set forth.

SHERIDAN SMITH PIPER.

Witnesses:
J. B. WEST,
J. H. JORDAN.

Copies of this patent may be obtained for five cents each, by addressing the "Commissioner of Patents, Washington, D. C."